United States Patent
Erno et al.

(10) Patent No.: US 12,103,227 B2
(45) Date of Patent: *Oct. 1, 2024

(54) POWDER REMOVAL FLOATING STRUCTURES

(71) Applicant: General Electric Company, Schenectady, NY (US)

(72) Inventors: Daniel Jason Erno, Clifton Park, NY (US); Arunkumar Natarajan, Schenectady, NY (US); Ken Ivcar Salas Nobrega, Schenectady, NY (US); Ananda Barua, Glenville, NY (US)

(73) Assignee: General Electric Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/743,674

(22) Filed: May 13, 2022

(65) Prior Publication Data
US 2022/0274169 A1  Sep. 1, 2022

Related U.S. Application Data

(63) Continuation of application No. 16/003,777, filed on Jun. 8, 2018, now Pat. No. 11,344,949.

(51) Int. Cl.
*B22F 10/68* (2021.01)
*B22F 3/24* (2006.01)
(Continued)

(52) U.S. Cl.
CPC .............. *B29C 64/153* (2017.08); *B22F 3/24* (2013.01); *B22F 10/14* (2021.01); *B22F 10/28* (2021.01); *B22F 10/40* (2021.01); *B22F 10/68* (2021.01); *B28B 1/001* (2013.01); *B28B 11/22* (2013.01); *B29C 64/35* (2017.08); *B29C 64/393* (2017.08); *B33Y 10/00* (2014.12); *B33Y 40/00* (2014.12); *B33Y 40/20* (2020.01); *B33Y 50/02* (2014.12);
(Continued)

(58) Field of Classification Search
CPC ...................................................... B22F 10/68
See application file for complete search history.

(56) References Cited

U.S. PATENT DOCUMENTS

| | | |
|---|---|---|
| 7,220,380 B2 | 5/2007 | Farr et al. |
| 8,185,229 B2 | 5/2012 | Davidson |

(Continued)

FOREIGN PATENT DOCUMENTS

| | | |
|---|---|---|
| EP | 3192599 A1 | 7/2017 |
| EP | 3199269 A1 | 8/2017 |
| EP | 3199270 A1 | 8/2017 |
| GB | 2517490 A | 2/2015 |
| WO | WO2017198335 A1 | 11/2017 |

OTHER PUBLICATIONS

Yang et al., Manufacturability of Overhang Structures Fabricated by Binder Jetting Process, IMECE2016-65927, ASME 2016 International Mechanical Engineering Congress and Exposition, vol. 2, Nov. 11-17, 2016, 5 Pages.

*Primary Examiner* — Christopher S Kessler
(74) *Attorney, Agent, or Firm* — Dority & Manning, P.A.

(57) ABSTRACT

An article of manufacture includes a part structure formed via a first additive manufacturing process and a floating structure within the part structure which is mechanically decoupled from the part structure. The floating structure is formed concurrently with the part structure via the first additive manufacturing process.

15 Claims, 6 Drawing Sheets

(51) Int. Cl.

| | | |
|---|---|---|
| *B22F 10/14* | (2021.01) | |
| *B22F 10/28* | (2021.01) | |
| *B22F 10/40* | (2021.01) | |
| *B28B 1/00* | (2006.01) | |
| *B28B 11/22* | (2006.01) | |
| *B29C 64/153* | (2017.01) | |
| *B29C 64/35* | (2017.01) | |
| *B29C 64/393* | (2017.01) | |
| *B33Y 10/00* | (2015.01) | |
| *B33Y 40/00* | (2020.01) | |
| *B33Y 40/20* | (2020.01) | |
| *B33Y 50/02* | (2015.01) | |
| *B33Y 80/00* | (2015.01) | |

(52) U.S. Cl.
CPC ......... *B33Y 80/00* (2014.12); *B22F 2003/247* (2013.01); *B22F 2202/01* (2013.01); *Y10T 428/12014* (2015.01); *Y10T 428/12063* (2015.01); *Y10T 428/12076* (2015.01)

(56) References Cited

U.S. PATENT DOCUMENTS

| | | |
|---|---|---|
| 8,728,685 B2 | 5/2014 | Burns et al. |
| 9,120,151 B2 | 9/2015 | Godfrey et al. |
| 9,586,365 B2 | 3/2017 | Chen et al. |
| 2011/0129640 A1 | 6/2011 | Beall et al. |
| 2016/0074940 A1* | 3/2016 | Cote ..................... B33Y 40/20 134/23 |
| 2016/0228929 A1* | 8/2016 | Williamson ............ F01D 25/24 |
| 2017/0095888 A1 | 4/2017 | Butcher |
| 2017/0144381 A1 | 5/2017 | Ott et al. |
| 2017/0144382 A1 | 5/2017 | Ott et al. |
| 2017/0197284 A1 | 7/2017 | Twelves, Jr. et al. |
| 2017/0216921 A1 | 8/2017 | Oswald et al. |
| 2017/0217094 A1 | 8/2017 | Oswald et al. |
| 2017/0297111 A1* | 10/2017 | Myerberg ............... B28B 1/001 |
| 2018/0001384 A1* | 1/2018 | Manteiga ................ B22F 10/28 |
| 2018/0134911 A1 | 5/2018 | Neuman |
| 2019/0126351 A1* | 5/2019 | Geisen .................. B33Y 40/20 |
| 2019/0201982 A1 | 7/2019 | Lombardo et al. |

\* cited by examiner

POWDER REMOVAL FLOATING STRUCTURES

CROSS-REFERENCE TO RELATED APPLICATIONS

The present application is a continuation of and claims priority to U.S. application Ser. No. 16/003/777 entitled "Powder Removal Floating Structures", filed Jun. 8, 2018, the entire disclosure of which is hereby expressly incorporated by reference herein.

BACKGROUND

The present disclosure relates generally to powder removal methods and systems for manufacturing.

Additive manufacturing or three-dimensional (3-d) printing is a process of forming an article one layer at a time. Several modalities or methods of additive manufacturing utilize a powder-bed printing process where a layer of powder is deposited and a roller or scraper is used to level the height of the powder. A sourced of heat may be introduced to the powder selectively to melt or fuse the powder. Alternatively, a binder may be selectively applied to the powder after the powder is leveled. The process is repeated until the geometry of a part or component is printed.

When the part is embedded in the powder bed during printing, many or all internal structures may be filled with powder, which may be metallic and/or other materials. Post-process steps such as heat treat, surface finishing and subtractive manufacturing processes are often performed to further enhance the properties or geometry of the part. While the part is still being manufacturing, it is in a "green" state. The green part may be less robust than a fully finished part, and special techniques may be required to de-powder the green part such that the part itself does not break during handling and de-powdering, especially for parts with complex internal geometries and cavities.

SUMMARY OF THE INVENTION

In one aspect, an article of manufacture includes a part structure formed via a first additive manufacturing process and a floating structure within the part structure and mechanically decoupled from the part structure. The floating structure is formed concurrently with the part structure via the first additive manufacturing process.

In another embodiment a powder removal method includes identifying a part geometry, identifying a cavity within the part to place a powder removal feature, defining at least one characteristic of the powder removal feature, creating a build file for forming the part and the powder removal feature via a generative build process, generatively forming the part and the powder removal feature, and vibrating the part and the powder removal feature.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
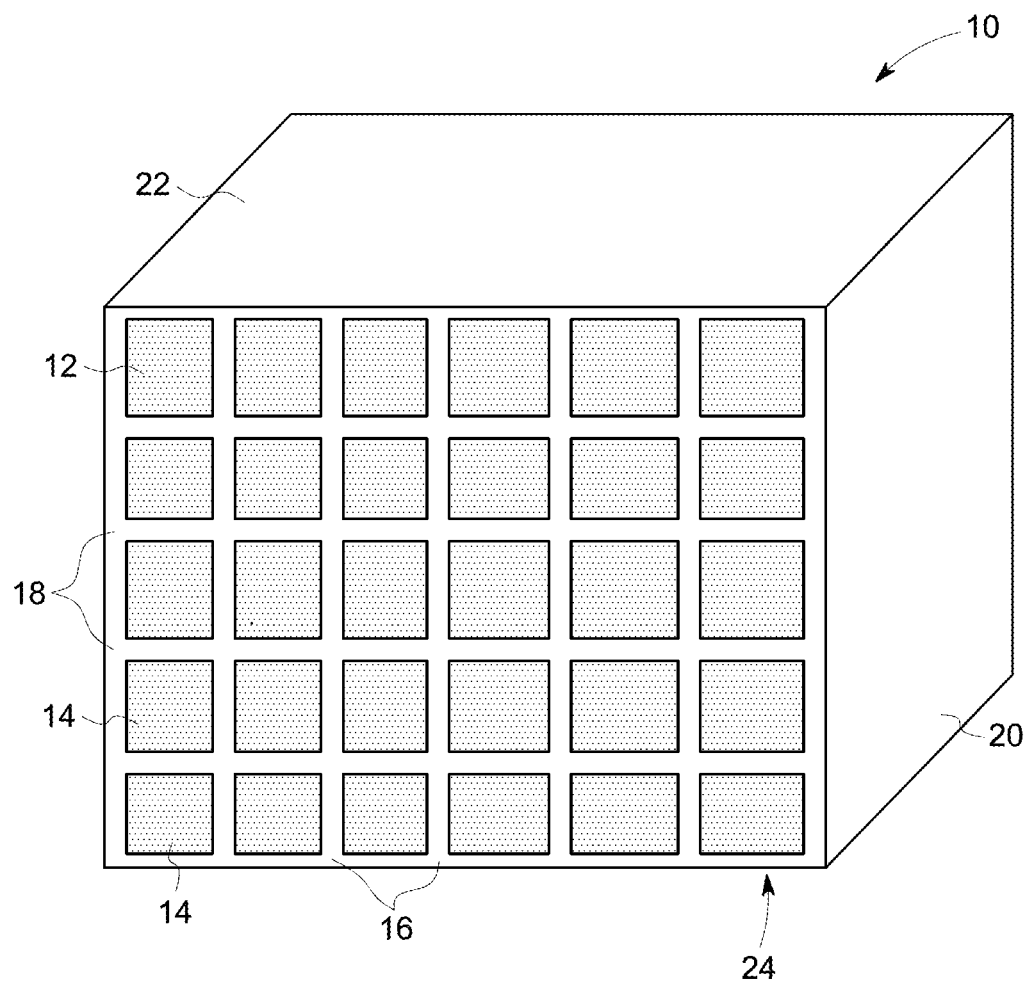
FIG. 1 is an illustration of a powder-filled part formed via additive manufacturing.

Unless otherwise indicated, the drawings provided herein are meant to illustrate features of embodiments. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the term "monolithic" describes structures formed of a single, continuous, homogeneous consistency.

As used herein, the term "modality" refers to any additive manufacturing build methods and processing including but not limited to binder jetting, directed energy deposition, material extrusion, selective laser melting (SLM), material jetting, powder bed fusion, sheet lamination, welding, brazing, vat photopolymerization, stereolithography (SLA), direct metal laser melting (DMLM), fused deposition modeling (FDM), direct metal laser sintering (DMLS), and electron beam melting (EBM). There are also additive modalities that do not utilize powder. Additive manufacturing is also referred to as a generative build process.

As used herein, the term "powder" may to various materials including but not limited to metallic, ceramic and polymer powders. Powder characteristics such as size, material, density and other properties may depend on the modality being employed.

As used herein, the terms "de-powder" and "powder removal" refer to the process of removing excess powder from a part following or during the build phase.

Among the additive manufacturing build methods that employ powder bed modalities and/or powder as an input material, there are variations in powder size distribution leading to varying packing density of the powder. For example, for many modalities, a higher powder packing density is desired in order to decrease the porosity of the resulting finished part. For other modalities, lower powder packing densities are desired in order to increase the flowability of the powder which may enhance the resolution of the fine feature details of the process. As such, powder removal may be more challenging in some additive modalities than for others, especially modalities for which powder removal occurs while the part is in a green state, because of limitations in the ability to shake or vibrate the green part without damaging it.

FIG. 1 is an illustration of a part 10 made via additive manufacturing. The part may be in a green state, and not fully finished. The part 10 includes a plurality of horizontally and vertically spaced channels 14 defined between a plurality of vertical walls 16 and a plurality of horizontal walls 18. The part 10 may include at least one side wall 20, a top surface 22 and a bottom surface 24. Each channel of the plurality of horizontally and vertically spaced channels 14 is filled with powder 12 as a result of manufacturing via a powder bed additive manufacturing process. The plurality of horizontally and vertically spaced channels 14 appear with rectangular and/or square cross-sections in the embodiment of FIG. 1. However, channels with other cross-sectional shapes such as circles, triangles, parallelograms and other shapes are also possible. In addition, cavities other than channels such as voids, reservoirs, plenums, lattice structure voids, ducts, manifolds, etc. are also possible.

Figure 2:
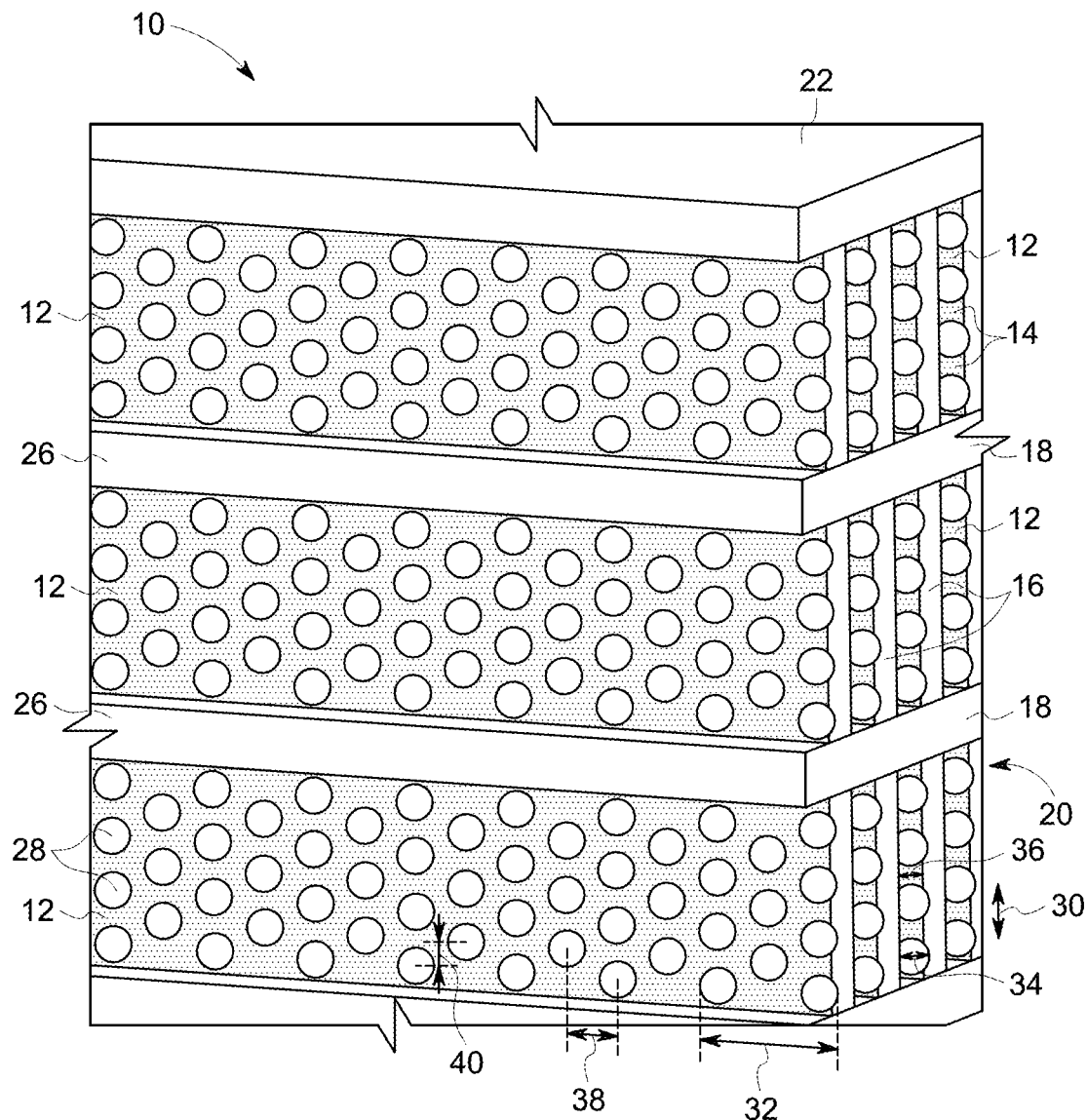
FIG. 2 is an illustration of a part formed via additive manufacturing, including powder removal features.

FIG. 2 is a cross-section illustration of a part 10 according to the present embodiments, including a top surface 22, at least one side wall 20 as well as cut surfaces 26 that illustrate the plane through which a cut was taken, thereby illustrating the internal details of the part 10. The cut surfaces 26 provide ease of illustration and would likely not be included in a part 10. The part 10 includes a plurality of vertical walls 16 and a plurality of horizontal walls 18 which define the horizontally and vertically spaced channels 14. Each of the channels 14 is filled with powder 12 as well as at least one floating structure 28 which may be formed during the build process and rests in the powder 12. In one embodiment, at least one floating structure is formed concurrently with the part 10 or green state part structure via the same additive manufacturing process in which the part 10 is formed. The as least one floating structure 28 is encapsulated in, immersed in and/or surrounded by the powder 12. As illustrated in FIG. 2, the floating structures 28 are shown as spherical, however, other shapes such as three-dimensional ellipses, star shapes, cubes, rectangles, cylinders, polygonal, pyramids, diamonds, triangles and other three-dimensional geometries are also possible.

Each of the floating structures 28 are sized so that its largest width 34 (or diameter for spherical floating structures 28) is less than the channel width 36. The floating structures 28 are no mechanically coupled to the internal structure of part 10, so each floating structure 28 may be easily removed from the part 10 with minimal friction between the floating structures 28 and the channel walls 16, 18. The floating structures 28 may include a depth spacing 32 which defines how far a first floating structure 28 is behind a second floating structure 28, within the same channel 14. A vertical spacing 30 may define the vertical distance between floating structures 28 within the same channel 14. As illustrated in FIG. 2, the floating structures 28 may also be staggered such that adjacent rows are separated by a vertical stager distance 40 and a depth stager distance 38, where the vertical stager distance 40 and the depth stager distance 38 may be less than the respective vertical spacing 30 and depth spacing 32. In some embodiments, the floating structures 28 may be attached to the part 10 using a reduced mechanical coupling or attachment means such that the floating structures 28 remain in place during the build process but also easily break free due to gravity, vibrations or other forces during the powder removal process.

During powder removal, the floating structures 28, which are not mechanically coupled to any wall or internal structure of the part 10, are moved back and forth within the channels 14 to push the powder 12 out of the channels 14. An external force and/or vibrations may be applied to the part 10 to cause relative motion between the floating structures 28 and the surrounding powder 12, due at least in part to the mass and inertia of the floating structures 28. The relative motion between the floating structures 28 and the surrounding powder 12 causes the floating structures to push powder 12 out of the channels 14, which is also aided by both the external force and/or vibrations, as well as by gravity. The movement of the floating structures 28, which are mechanically decoupled from the part 10, may increase the effectiveness of the powder removal process, compared to a process that uses only external forces and/or vibrations.

In addition, the floating structures 28 may decrease the magnitude of the external forces and/or vibrations required for powder removal, which may thus result in reduced stresses on the part 10, and a reduced likelihood of damaging the part 10 during powder removal processes. This protective aspect may be of particular importance for use with parts 10 that are still in a "green," or non-final processed state during powder removal. A part structure or "green" state part is a part 10 while it is still in the process of being manufactured, for example after printing by prior to heat treatment. Furthermore, for parts 10 with complex internal geometries, such as those including three-dimensional passageways and other features that are not readily accessible via an external access port, the floating structures 28 within internal inaccessible cavities will aid in powder removal.

The floating structures 28 may be formed via various additive manufacturing modalities including (but not limited to) powder bed, binder jet, DMLM, DMLS, SLM, EBM and others. Using binder jet and other similar modalities, a smooth layer of powder 12 can be spread out across a build area and a binder is selectively applied to areas in which a part 10 or floating structure 28 is being formed. Another smoother layer of powder 12 can then be spread out on top and then a successive layer of binder may be selectively applied on top of the first and/or previous layer according to the desired geometry of the part 10 or floating structure 28. The process is repeated over and over again until the part 10 or floating structures 28 are formed, one layer at a time. There is no requirement that the part 10 and floating structures 28 be in contact with each other, and therefore free-floating floating structures 28 can be formed within the internal cavities of the part 10.

Using other modalities such as but not limited to DMLM, DMLS, SLM, EBM and other modalities that include an external heat source selectively applied to each successive layer of smooth powder, the magnitude of the external heat source (e.g., the laser power or electron beam intensity) can be adjusted when forming the first and/or first several layers of the floating structures 28, such that the powder 12 may have different melt, sintering and/or bonding characteristics. The magnitude of the external heat source can then be adjusted, as needed (depending on powder material properties and the ability to tightly control the magnitude of the heat source), for each successive layer forming the floating structure 28 allowing floating structures 28 to be formed within the internal cavities of the part 10. Such an approach is one method of forming a floating structure 28 without a support structure. In addition, it may be possible to use a support structure that is floating and/or becomes free following the build process to aid in powder removal, similar to the floating structures 28 described herein. Similar results may also be achievable with DMLM, DMLS, SLM, EBM, etc. via selective application of binders during the build process.

While the application of varying magnitude heat and/or binders during the build process described above may be insufficient for providing the desired material properties of a finished or partially finished part 10, such methodology may be sufficient for use as part of a floating structure 28, which may be recycled, scrapped, and/or have no ongoing function following the powder removal process. In addition, the exact placement of a floating structure 28 within a cavity may be less important since the floating structure 28 is intended to move around during the powder removal process. Therefore, if the process described above for forming floating structures 28 using DMLM, DMLS, SLM, EBM and other similar modalities produces variations in the location, material properties and/or geometry of the floating structure 28, the floating structure 28 may nevertheless be sufficient for purposes of powder removal.

Figure 3:
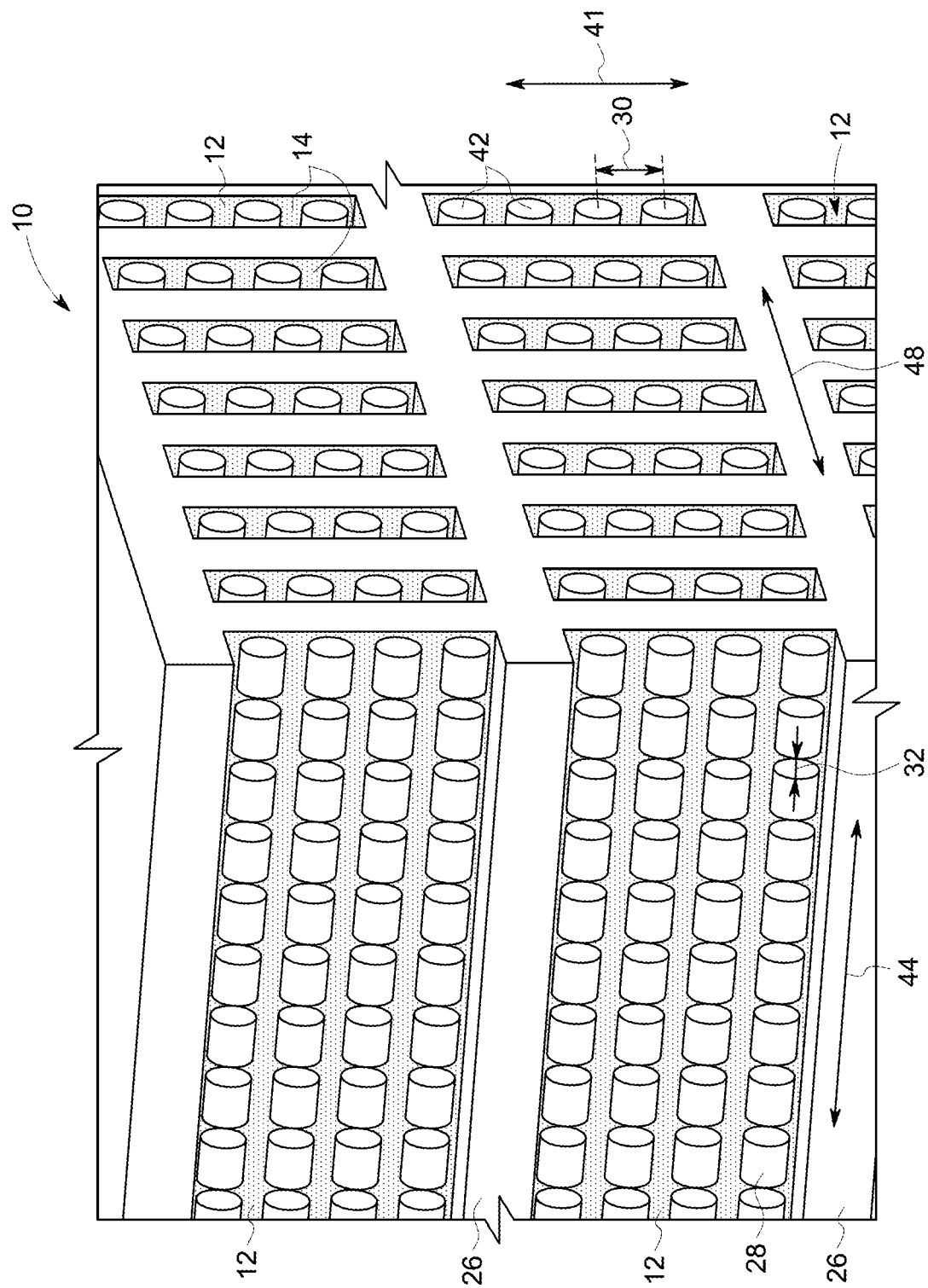
FIG. 3 is an illustration of a part formed via additive manufacturing, including powder removal features.

FIG. 3 sectional illustration of a part 10 including a plurality of cylindrical floating structures 28' surrounded by powder 12 within the channels 14. FIG. 3 includes cut surfaces 26 that illustrate the plane through which a cut was taken, thereby illustrating the internal details of the part 10. A vertical spacing 30 and a depth spacing 32 define the vertical and depth-wise distances between the cylindrical floating structures 28'. The cylindrical floating structures 28' are oriented such that circular faces 42 face in a depth-wise direction 44. Stated otherwise, the cylinder length of the floating structure 28' is aligned in the depth-wise direction 44. In other embodiments, the cylindrical floating structures 28 may be oriented such that circular faces are oriented in a vertical direction 46, or along a width-wise horizontal axis 48. In other embodiments, multiple floating structures 28' and various combinations along the depth-wise direction 44, vertical direction 46 and width-wise horizontal axis 48 may be used to enhance the powder removal process. In addition, the spacings between the cylindrical floating structures 28' may be defined from sphere center to sphere center in the case of spherical floating structures 28 or from circular face 42 to circular face 42 in the case of cylindrical floating structures 28'. Other spacing arrangements may be defined as needed.

Figure 4:
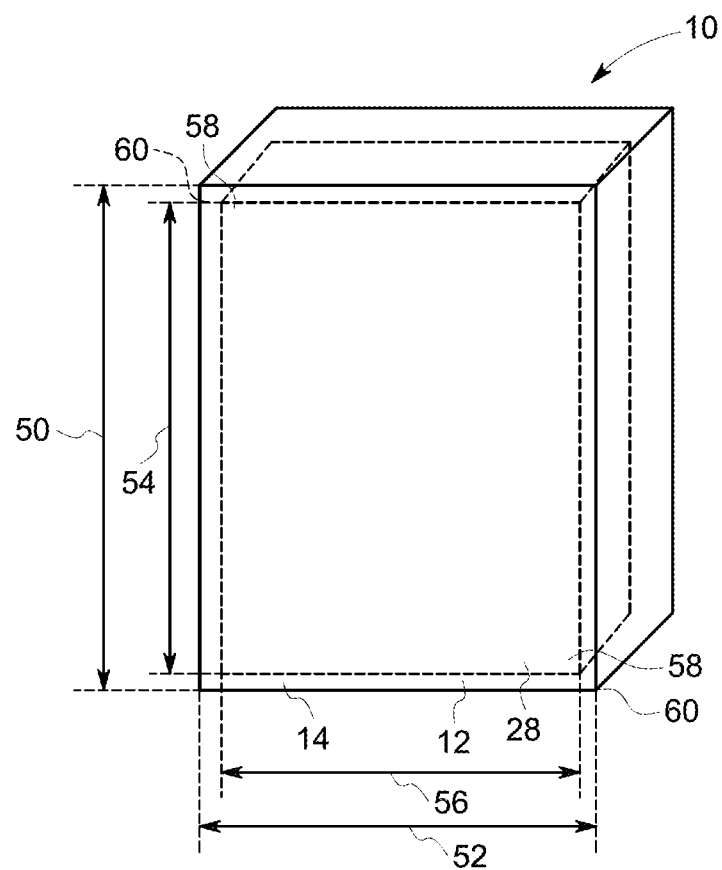
FIG. 4 is an enlarged cross-section of a channel of a part formed via additive manufacturing, including a powder removal feature.

FIG. 4 illustrates a part 10 including an exemplary single channel 14 and an exemplary single floating structure 428. The channel 14 has a rectangular cross section with a channel height 50 and a channel width 52. The floating structure 428 has a rectangular cross section with a floating structure height 54 and a floating structure width 56. In the arrangement of FIG. 4, the floating structure 428 occupies a high percentage of the volume of the channel 14, thereby reducing the available volume that powder 12 may occupy. In one embodiment, the floating structure 428 may occupy form about 60% to about 100% of the volume of the channel 14. In another embodiment, the floating structure 428 may occupy form about 80% to about 99% of the volume of the channel. In another embodiment, the floating structure 428 may occupy form about 85% to about 97% of the volume of the channel. In another embodiment, the floating structure 428 may occupy form about 90% to about 95% of the volume of the channel. In addition, the floating structure 428 has a similar or identical cross-sectional shape (rectangular in FIG. 4) and/or aspect ratio (the ratio of length to width) which allows the floating structure corners 58 to be close to the corners 60 of the channel 14 where powder 12 may be difficult to remove. In one embodiment, each of the floating structure height 54 and width 56 may be greater than about 80% of the respective channel height 50 and width 52. In another embodiment, each of the floating structure height 54 and width 56 may be greater than about 90% of the respective channel height 50 and width 52. In another embodiment, each of the floating structure height 54 and width 56 may be greater than about 95% of the respective channel height 50 and width 52. In another embodiment, each of the floating structure height 54 and width 56 may be greater than about 99% of the respective channel height 50 and width 52. The floating structure 428 of FIG. 4 may be designed such that the floating structure 428 can only be in a single orientation within the channel 14, thereby ensuring that the floating structure corners 58 will be close to the corners 60 of the channel 14.

Figure 5:
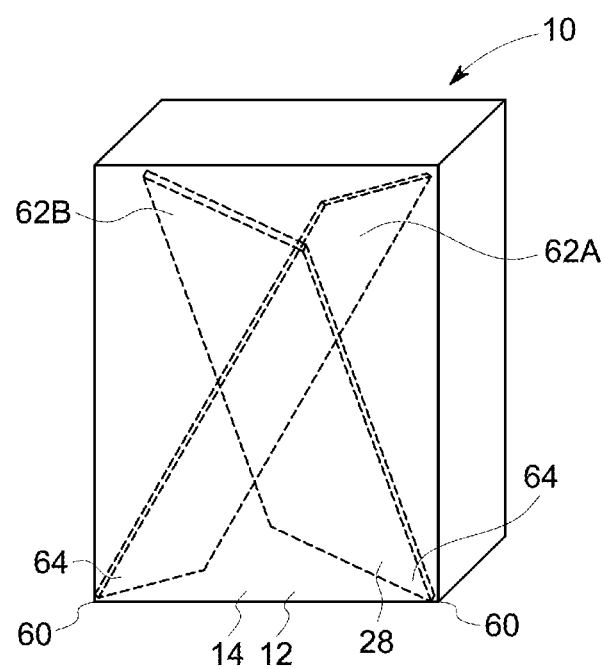
FIG. 5 is an enlarged cross-section of a channel of a part formed via additive manufacturing, including a powder removal feature.

FIG. 5 illustrates a part 10 including an exemplary single channel 14 and an exemplary single floating structure 528. The channel 14 is defined in part by walls that meet at corners 60. The floating structure 528 includes a first planar section 62A and a second planar section 62B which intersect to form an X-shaped cross section. A plurality of corner edges 64 of the x-shaped floating structure 528 of FIG. 5 are oriented close to the corners 60 of the channel 14 to enhance powder removal within the channel 14, while reducing the volume of the floating structure 528 when compared to the embodiment of FIG. 4. In other embodiments, floating structures 528 with other arrangements including arms and/or portions that are biased toward a corner or internal area within a channel 14 may be used to aid in the powder removal process.

Figure 6:
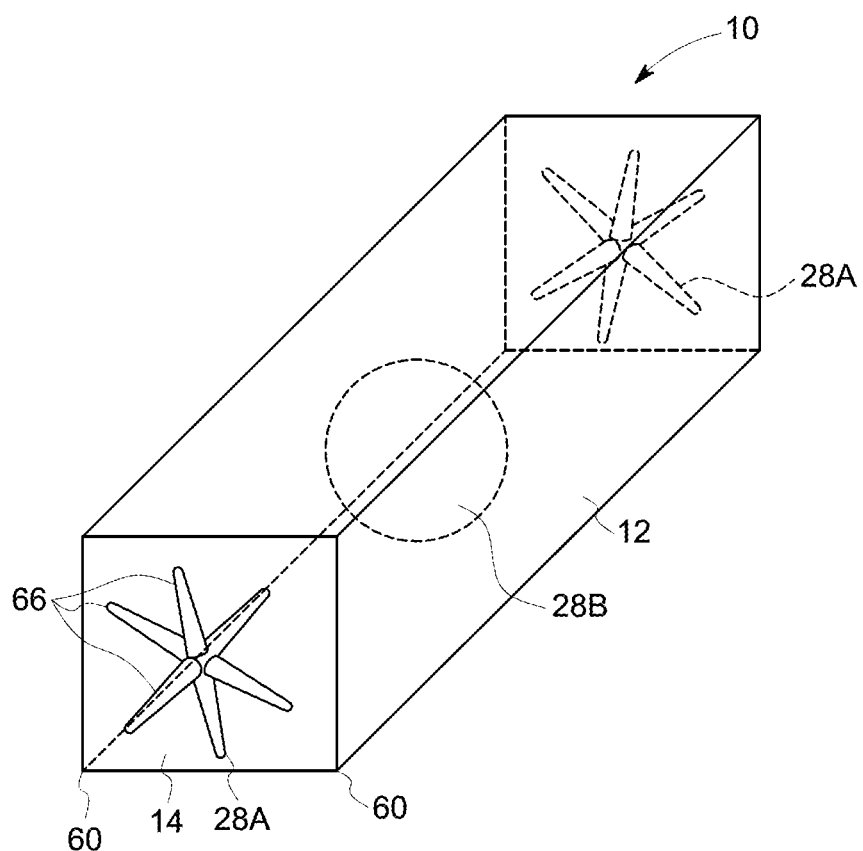
FIG. 6 is an enlarged cross-section of a channel of a part formed via additive manufacturing, including multiple powder removal features.

FIG. 6 illustrates a part 10 including an exemplary single channel 14 and multiple floating structures 28A and 28B. A first floating structure 28A may be jack-shaped with 6 prongs 66 extending in 6 mutually orthogonal directions. A second floating structure 28B may be spherical. During the powder removal process, the jack-shaped first floating structure 28A may be oriented so that at least one of the 6 prongs 66 is proximate one of the corners 60 of the channel 14. The spherical second floating structure 28B may aid in pushing the first floating structure 28A as well as powder 12 out of the channel 14. Other arrangements using other combinations and shapes of floating structures 28 are also possible.

Figure 7:
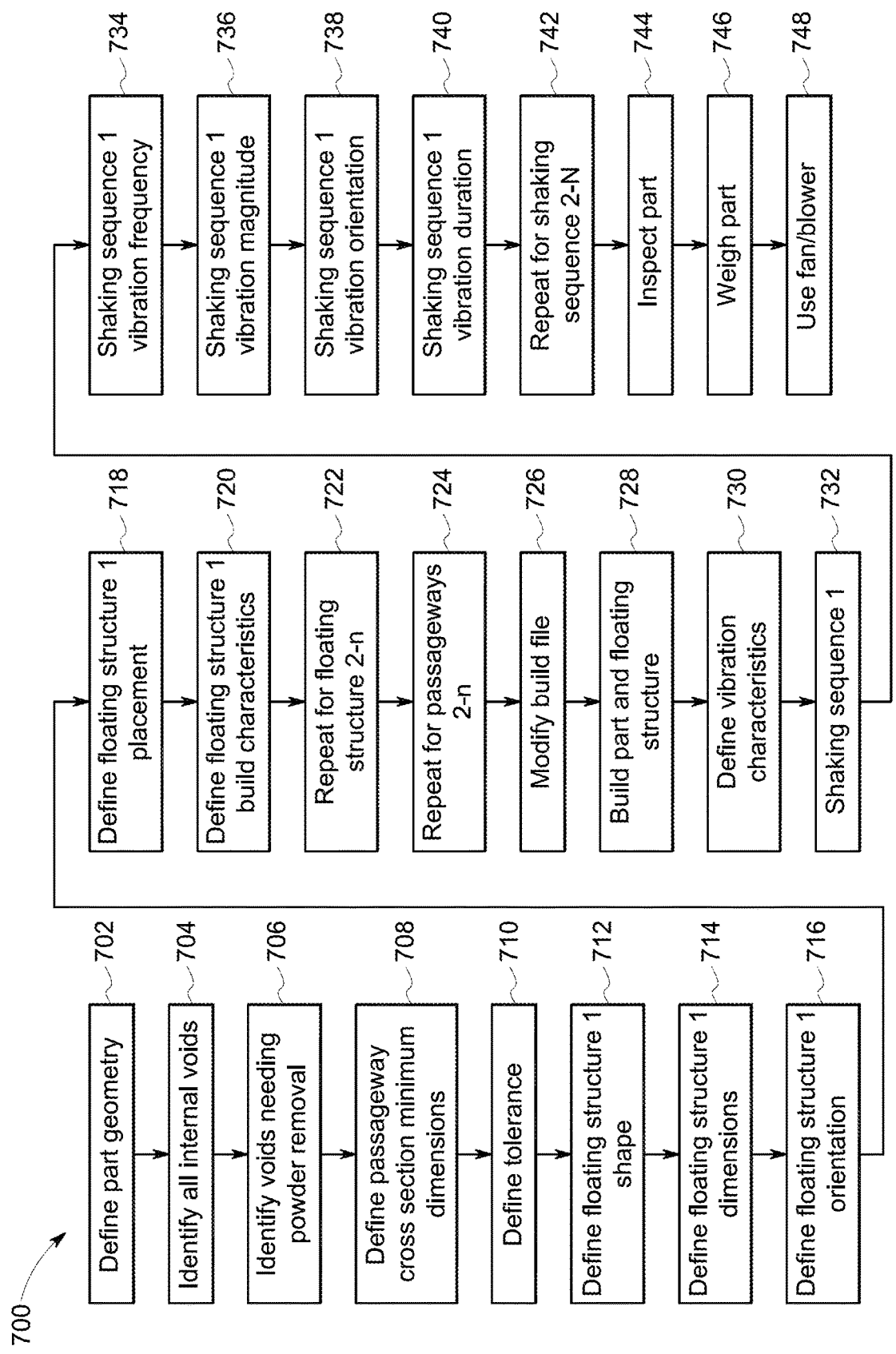
FIG. 7 is a powder removal method, according to the present embodiments.

FIG. 7 illustrates a powder removal process 700 including the steps of: defining a part geometry 702, identifying all of the internal voids 704, identifying the voids needing powder removal 706, defining the minimum dimensions of passageway cross sections 708, defining tolerances 710, defining the shape of a first floating structure 712, defining the dimensions of the first floating structure 714, defining the orientation of the first floating structure 716, defining the placement of the first floating structure 718, defining the build characteristics (such as porosity, solidity, fill, hardness, etc.) of the first floating structure 720, repeating the above steps for a second through n-number of floating structures 722, defining the spacings (depth, vertical and horizontal)

between floating structures, repeating the above steps for each additional passageway 724, creating a build file for the part and floating structures 726, building the part and floating structures 728, defining vibration characteristics 730, initiating a first vibration sequence (including a vibration frequency, magnitude, orientation and duration) 732, 734, 736, 738 and 740, initiating a second through n-number of vibration sequences 742, inspecting the part 744, weighing the part to assess the amount of powder still remaining in the part 746, using a fan, blower, or vacuum 748, and repeating one or more of the steps. The method of FIG. 7 may include other steps. In addition, in some embodiments, not all of the steps will be performed. In other embodiments, the steps will be performed in a different order.

Arrangements of the present embodiments may include using the floating structures 28 for other purposes during the build process including (but not limited to) vibration damping, thermal management, structural support and other purposes. The present embodiments may also include inserting a floating structure 28 into one or more channels 14 of the part 10 during the build process, after the build process and/or during the powder removal processes, including after some of the powder has been removed, and including re-inserting a floating structure 28 that has already been removed.

The floating structures 28 of the present embodiments may help to loosen powder 12 that is tightly packed into internal channels 14 and other cavities of a part 10. Once powder 12 is loosened by the floating structures 28, powder 12 may begin to flow out as a result of gravity and/or vibrations. The vibration and/or shaking may be applied along multiple axes and/or orientation, as needed based on the geometry of the part 10. Stated otherwise, it may be beneficial to cause the floating structures 28 to have momentum in a multitude or orientations to loosen powder 12 that may be trapped in the internal channels 14 of the part 10, which may have particular orientations. The density and/or vibrational characteristics of the floating structures 28 may be different than those of the powder 12, causing the relative motion therebetween during the powder removal process. The floating structures 28 of the present embodiments may strike a balance between mass, density, structural stiffness, shape and other factors so as to allow the floating structures 12 to be easily removable from the part 10 without damaging the part 10 and while simultaneously yielding efficient powder 12 removal.

By allowing the floating structures 28 to be filled with loose powder 12 during the build process, the floating structures 28 may achieve the desired mass without needing to be a monolithic solid. In addition, filling the floating structures 28 with loose powder 12 may reduce the amount of binder that is needed during a binder jet build process and/or may reduce the amount of heat that is required during DMLM, DMLS, SLM, EBM build processes and other similar modalities that include an external heat sourced being selectively applied to powder. It may also be possible to partially remove loose powder 12 from the interior of a floating structure 28 by blowing or suctioning the powder 12 from the floating structure 28 while it is partially formed and still has a cavity that is open. In such embodiments, the external geometry of the floating structure 28 is maintained while decreasing the mass of the floating structure 28 (since it will be hollow or only partially filled with powder 12), which may be desired to reduces stresses on the part 10 during the powder removal process.

The methods and embodiments described herein provide enhanced removal of powder from additively manufactured parts, especially parts with complex internal geometries, those made via powder bed additive manufacturing modalities, and those with fine feature details. In addition, methods and embodiments described herein enhance powder removal with additive modalities such as DMLM, DMLS, SLM, EBM that use a heat source, and also with modalities such as binder jet, where the part remains in a green state post-printing (prior to heat treatment) during which time the part is structurally less robust and not able to accommodate large vibrations from shaking, which is often used as a means for removing powder.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A powder removal method, comprising:
   generatively forming a part structure and at least one floating structure disposed within at least one channel defined by the part structure from a build file via a generative build process, the at least one channel including powder disposed therein, the at least one floating structure surrounded by the powder, the at least one channel defining an opening sized for removal of the at least one floating structure from the at least one channel; and
   vibrating the part structure and the at least one floating structure so as to remove the powder and the at least one floating structure from within the at least one channel through the opening,
   wherein the at least one floating structure occupies from 80% to 99% of the volume of the at least one channel.

2. The method of claim 1, further comprising generatively forming more than one powder removal feature.

3. The method of claim 1, further comprising defining at least one vibration parameter.

4. The method of claim 3, further comprising vibrating the part structure and the at least one floating structure according to the at least one vibration parameter, wherein the at least one vibration parameter comprises at least one of a vibration frequency, a vibration magnitude, a vibration orientation, and a vibration duration.

5. The method of claim 4, further comprising at least one post-vibrating step,
   wherein the at least one post-vibrating step comprises at least one of visually inspecting the part structure, weighing the part structure, air-blowing the part structure, or vacuuming the part structure.

6. The method of claim 1, further comprising, prior to generatively forming the part structure from a build file:
   identifying a part geometry of the part structure;
   defining at least one characteristic of the at least one floating structure; and
   creating the build file for forming the part structure from the part geometry and the at least one characteristic of the at least one floating structure.

7. The method of claim 6, wherein defining at least one characteristic of the at least one floating structure comprises at least one of defining a shape, dimension, orientation within the part structure, location within the part, or porosity.

8. The method of claim 6, further comprising identifying the dimension of a minimum cross section for the at least one cavity of the part structure.

9. The method of claim 6, further comprising generatively forming more than one floating structure,
   wherein defining at least one characteristic of the at least one floating structure comprises at least one of defining a shape, dimension, orientation within the part structure, location within the part structure, or porosity.

10. The method of claim 1, further comprising, upon vibrating the part structure and the at least one floating structure, pushing the powder out from the at least one channel with the vibrating of the at least one floating structure.

11. A method of additively manufacturing a part structure, the method comprising:
   additively manufacturing a part structure and a plurality of floating structures disposed within a channel defined by the part structure, wherein the channel comprises an opening sized for removal of the plurality of floating structures from the channel, and
   wherein the channel contains powder surrounding each floating structure of the plurality of floating structures; and
   removing the plurality of floating structures and the powder from the channel through the opening at least in part by causing relative motion between the plurality of floating structures and the powder;
   wherein the plurality of floating structures occupy from 80% to 99% of the volume of the channel.

12. The method of claim 11, wherein the relative motion is a vibration of the part structure and the plurality of floating structures.

13. The method of claim 12, wherein the vibration is performed according to at least one vibration parameter.

14. The method of claim 13, wherein the at least one vibration parameter comprises at least one of a vibration frequency, a vibration magnitude, a vibration orientation, or a vibration duration.

15. The method of claim 12, further comprising:
   at least one post-vibrating step, wherein the at least one port-vibrating step comprises at least one of visually inspecting the part structure, weighing the part structure, air-blowing the part structure, or vacuuming the part structure.

* * * * *